US012786611B2

(12) United States Patent
Zhang et al.

(10) Patent No.: US 12,786,611 B2
(45) Date of Patent: Nov. 3, 2026

(54) HEADSET CONTROL METHOD, HEADSET, APPARATUS, AND STORAGE MEDIUM

(71) Applicant: HUAWEI TECHNOLOGIES CO., LTD., Shenzhen (CN)

(72) Inventors: Libin Zhang, Beijing (CN); Chang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 18/815,959

(22) Filed: Aug. 27, 2024

(65) Prior Publication Data

US 2024/0422468 A1 Dec. 19, 2024

Related U.S. Application Data

(63) Continuation of application No. PCT/CN2022/078346, filed on Feb. 28, 2022.

(51) Int. Cl.

| | |
|---|---|
| ***H04R 1/10*** | (2026.01) |
| ***G10L 15/04*** | (2013.01) |
| ***G10L 25/51*** | (2013.01) |

(52) U.S. Cl.

CPC ............ *H04R 1/1041* (2013.01); *G10L 15/04* (2013.01); *G10L 25/51* (2013.01); *H04R 1/1083* (2013.01);

(Continued)

(58) Field of Classification Search

CPC ................ H04R 1/1041; H04R 1/1083; H04R 2460/01; H04R 2460/07; H04R 2499/13;

(Continued)

(56) References Cited

U.S. PATENT DOCUMENTS

2001/0046304 A1* 11/2001 Rast ..................... H04R 1/1083 381/26
2006/0140416 A1* 6/2006 Berg ....................... A61F 11/12 381/72

(Continued)

FOREIGN PATENT DOCUMENTS

CN 103065627 B 7/2015
CN 105611443 A 5/2016

(Continued)

OTHER PUBLICATIONS

Liudi et al: Technical requirements and testing methods for commercial vehicle and trailer braking systems, GB12676, Ministry of Industry and Information Technology, Oct. 10, 2014, total 174 pages.

(Continued)

*Primary Examiner* — Oyesola C Ojo

(57) ABSTRACT

Embodiments of the present disclosure provide a headset control method, a headset, a headset control apparatus, and a related storage medium. The method includes: collecting environment information, and determining key sound detection sensitivity based on the environment information; performing key sound detection in the environment information based on the key sound detection sensitivity; and if a key sound exists in the environment information, adjusting the headset to a hear through mode, or playing the key sound. The headset collects the environment information, determines the key sound detection sensitivity based on the environment information, and performs key sound detection in the environment information based on the key sound detection sensitivity. If the key sound exists, the headset is adjusted to the hear through mode, or the key sound is played. In this solution, the key sound detection sensitivity corresponding to the environment information is determined (Continued)

based on the environment information, to perform key sound detection.

17 Claims, 8 Drawing Sheets

(52) U.S. Cl.
CPC ...... *H04R 2460/01* (2013.01); *H04R 2460/07* (2013.01)

(58) Field of Classification Search
CPC ........... H04R 1/10; G10L 15/04; G10L 25/51; G10K 2210/1081; G10K 2210/30231; G10K 2210/3025; G10K 2210/3038; G10K 11/17837; G10K 11/17873
See application file for complete search history.

(56) References Cited

U.S. PATENT DOCUMENTS

2008/0240458 A1* 10/2008 Goldstein ............ H04R 1/1083 381/72
2013/0259239 A1* 10/2013 Aubreville ........... H04R 25/407 381/23.1
2018/0048956 A1* 2/2018 Zukowski ................ A42B 3/30
2019/0147845 A1* 5/2019 Goldstein ............ H04R 1/1016 381/56
2020/0137479 A1* 4/2020 Kamstrup ............... G06F 3/165
2022/0091674 A1* 3/2022 Kemmerer ....... G10K 11/17837
2022/0164160 A1* 5/2022 Laaksonen ........... H04R 1/1083
2023/0036986 A1* 2/2023 Visser .................. H04R 1/1083

FOREIGN PATENT DOCUMENTS

CN 105161093 B 7/2019
CN 112954532 A 6/2021
EP 1674061 A1 6/2006

OTHER PUBLICATIONS

Yanzhiqiche, Traffic Sign Recognition Principle and Control Application in Automatic Driving, Zhihu, May 27, 2020, total 17 pages.
Speech Recognition (III)—Sound Source Location, Antkillerfarm Hacking V7.5, Apr. 23, 2018, total 14 pages.
International Search Report and Written Opinion issued in PCT/CN2022/078346, dated Apr. 8, 2022, 9 pages.

* cited by examiner

HEADSET CONTROL METHOD, HEADSET, APPARATUS, AND STORAGE MEDIUM

CROSS-REFERENCE TO RELATED APPLICATIONS

This application is a continuation of International Application No. PCT/CN2022/078346, filed on Feb. 28, 2022, the disclosure of which is hereby incorporated by reference in its entirety.

TECHNICAL FIELD

The present disclosure relates to the field of headset technologies, and in particular, to a headset control method, a headset, an apparatus, and a storage medium.

BACKGROUND

In many scenarios, after putting on a headset, users want to have immersive experience in music or calls without being interfered by ambient sound, and a noise cancelling function of the headset may achieve this experience. However, with the headset on, users still need to pay attention to ambient sound in most cases. For example, users need to attach attention to station reports of transportation vehicles like buses or subways or vehicle horn sound when crossing streets. In these cases, a hear through mode or a transparent listening function of the headset is very useful. If users want to hear ambient sound, they only need to switch to the hear through mode, so that the headset lets the ambient sound in and reduces a noise cancelling effect.

Currently, Solo Pro is a headphone from Apple, and users may select the following listening modes: a noise cancelling mode, where this mode is used, with or without music, to enable a noise cancelling function and block all sounds around you; a hear through mode, where the Solo Pro headphone may amplify external noises, so that the user can still be aware of what happens around when listening to music; and an off mode, where the noise cancelling mode and the hear through mode are disabled, and only earcup is used for sound blocking. The user may open a "control center" and tap and hold a volume button of the headphone, or press a mode button on a left earcup, to switch between the noise cancelling mode and the hear through mode. However, the user needs to determine a switching occasion and perform manual control, and user experience is poor.

However, when detecting key information (such as a human voice or a key sound), a system that runs on Sony WH-1000XM4 headphones actively switches the noise cancelling mode to the hear through mode. For example, if a specific word is said in Speak-to-Chat, for example, "excuse me", the headphones may recognize a voice of the user and automatically stop the music. In this way, the ambient sound may enter, so that the user can have a conversation.

However, in the automatic switching manner of the headphone system, sensitivity of mode switching is the same in any scenario that meets a switching condition. As a result, precision of detecting key information in some scenarios is reduced, and user experience is further poor.

SUMMARY

The present disclosure discloses a headset control method, a headset, an apparatus, and a storage medium, to implement different detection precision of key information in different scenarios.

According to a first aspect, an embodiment of the present disclosure provides a headset control method, including:

- collecting environment information, and determining key sound detection sensitivity based on the environment information;
- performing key sound detection in the environment information based on the key sound detection sensitivity; and
- if a key sound exists in the environment information, adjusting the headset to a hear through mode, or playing the key sound.

In this embodiment of the present disclosure, the headset collects the environment information, determines the key sound detection sensitivity based on the environment information, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the environment information, to perform key sound detection. Based on this solution, the key sound detection sensitivity may be different in different scenarios, so that user experience can be improved.

In a first optional implementation, the environment information includes a current location of a user, and the determining key sound detection sensitivity based on the collected environment information includes:

- obtaining a speed limit parameter of a road corresponding to the current location of the user; and
- if a driving speed indicated by the speed limit parameter of the road exceeds a first preset value, determining that the key sound detection sensitivity is a first value.

In this embodiment of the present disclosure, the headset obtains the current location of the user, obtains the speed limit parameter of the road corresponding to the current location of the user, determines the key sound detection sensitivity based on the speed limit parameter of the road, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the speed limit parameter of the road corresponding to the current location of the user, to perform key sound detection. Based on this solution, an audio playing delay may be adaptively adjusted based on the road speed limit, so that the key sound detection sensitivity may be different in different scenarios, and user experience can be improved.

In a second optional implementation, the environment information includes a speed limit parameter of a road on which a user is currently located, and the determining key sound detection sensitivity based on the collected environment information includes:

- if a driving speed indicated by the speed limit parameter of the road exceeds a first preset value, determining that the key sound detection sensitivity is a first value.

In this embodiment, the headset directly obtains the speed limit parameter of the road on which the user is currently located, determines the key sound detection sensitivity based on the speed limit parameter of the road, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the speed limit parameter of the road corresponding to the current location of the user, to perform key sound detection. Based on this solution, an audio playing delay may be adaptively adjusted based on the road speed limit, so that the key sound detection sensitivity may be different in different scenarios, and user experience can be improved.

In a third optional implementation, the environment information includes a horn sound, and the determining key sound detection sensitivity based on the collected environment information includes:

if the horn sound is a horn sound of a first preset vehicle, determining that the key sound detection sensitivity is a first value.

In this embodiment, the headset directly obtains the horn sound in an environment, determines the key sound detection sensitivity based on the horn sound, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the horn sound, to perform key sound detection. Based on this solution, an audio playing delay may be adaptively adjusted based on the horn sound, so that the key sound detection sensitivity may be different in different scenarios, and user experience can be improved.

In a fourth optional implementation, the environment information includes an ambient sound, and the determining key sound detection sensitivity based on the collected environment information includes:

determining a sound source location based on the ambient sound;

determining a distance between the sound source location and a user; and if the distance is less than a second preset value, determining that the key sound detection sensitivity is a first value.

In this embodiment, the headset directly obtains the ambient sound, determines the key sound detection sensitivity based on the distance between the sound source location and the user, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the distance between the sound source location and the user, to perform key sound detection. Based on this solution, an audio playing delay may be adaptively adjusted based on the distance, so that the key sound detection sensitivity may be different in different scenarios, and user experience can be improved.

In a fifth optional implementation, the environment information includes a first ambient sound and a second ambient sound, the first ambient sound and the second ambient sound are obtained based on a preset time interval, and the determining key sound detection sensitivity based on the collected environment information includes:

determining a first location and a second location of a sound source separately based on the first ambient sound and the second ambient sound;

determining a moving speed of the sound source based on the first location and the second location of the sound source and the preset time interval; and if the moving speed exceeds a third preset value, determining that the key sound detection sensitivity is a first value.

In this embodiment, the headset obtains an ambient sound a plurality of times, determines the moving speed of the sound source, determines the key sound detection sensitivity based on the moving speed of the sound source, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the moving speed of the sound source, to perform key sound detection. Based on this solution, an audio playing delay may be adaptively adjusted based on the moving speed of the sound source, so that the key sound detection sensitivity may be different in different scenarios, and user experience can be improved.

In a sixth optional implementation, the environment information includes an ambient sound, and the determining key sound detection sensitivity based on the collected environment information includes:

obtaining a voice signal in the ambient sound, and segmenting the voice signal;

performing clustering processing on segmented voice signals, to determine a quantity of speakers; and if the quantity of speakers exceeds a fourth preset value, determining that the key sound detection sensitivity is a second value.

In this embodiment, the headset directly obtains the voice signal in the ambient sound, determines the quantity of speakers based on the voice signal, determines the key sound detection sensitivity based on the quantity of speakers, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the quantity of speakers, to perform key sound detection. Based on this solution, an audio playing delay may be adaptively adjusted based on the quantity of speakers, so that the key sound detection sensitivity may be different in different scenarios, and user experience can be improved.

According to a second aspect, an embodiment of the present disclosure provides a headset control method, including:

determining that key sound detection sensitivity of a headset is a first value, where the first value is determined based on a request sent by a user for improving the key sound detection sensitivity of the headset;

collecting environment information, and performing key sound detection in the environment information based on the first value; and if a key sound exists in the environment information, adjusting the headset to a hear through mode, or playing the key sound.

In this embodiment, the key sound in the collected environment information is detected based on the determined key sound detection sensitivity. If the key sound exists, the headset is adjusted to the hear through mode, or the key sound is played. In this solution, the key sound detection is performed based on the manually adjusted key sound detection sensitivity. Based on this solution, the key sound detection sensitivity is adjusted based on a user requirement, so that user experience can be improved.

According to a third aspect, an embodiment of the present disclosure provides a headset, including:

a collection module, configured to: collect environment information, and determine key sound detection sensitivity based on the environment information;

a detection module, configured to perform key sound detection in the environment information based on the key sound detection sensitivity; and a processing module, configured to: if a key sound exists in the environment information, adjust the headset to a hear through mode, or play the key sound.

In this embodiment, the headset collects the environment information, determines the key sound detection sensitivity based on the environment information, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the environment information, to perform key sound detection. Based on this solution, the key sound detection sensitivity may be different in different scenarios, so that user experience can be improved.

In an implementation, the environment information includes a current location of a user, and the collection module is configured to:

obtain a speed limit parameter of a road corresponding to the current location of the user; and if a driving speed indicated by the speed limit parameter of the road exceeds a first preset value, determine that the key sound detection sensitivity is a first value.

In this embodiment, the headset obtains the current location of the user, obtains the speed limit parameter of the road corresponding to the current location of the user, determines the key sound detection sensitivity based on the speed limit parameter of the road, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the speed limit parameter of the road corresponding to the current location of the user, to perform key sound detection. Based on this solution, an audio playing delay may be adaptively adjusted based on the road speed limit, so that the key sound detection sensitivity may be different in different scenarios, and user experience can be improved.

In another implementation, the environment information includes a speed limit parameter of a road on which a user is currently located, and the collection module is configured to:

if a driving speed indicated by the speed limit parameter of the road exceeds a first preset value, determine that the key sound detection sensitivity is a first value.

In still another implementation, the environment information includes a horn sound, and the collection module is configured to:

if the horn sound is a horn sound of a first preset vehicle, determine that the key sound detection sensitivity is a first value.

In another implementation, the environment information includes an ambient sound, and the collection module is configured to:

determine a sound source location based on the ambient sound;

determine a distance between the sound source location and a user; and if the distance is less than a second preset value, determine that the key sound detection sensitivity is a first value.

In still another implementation, the environment information includes a first ambient sound and a second ambient sound, the first ambient sound and the second ambient sound are obtained based on a preset time interval, and the collection module is configured to:

determine a first location and a second location of a sound source separately based on the first ambient sound and the second ambient sound;

determine a moving speed of the sound source based on the first location and the second location of the sound source and the preset time interval; and if the moving speed exceeds a third preset value, determine that the key sound detection sensitivity is a first value.

In yet another implementation, the environment information includes an ambient sound, and the collection module is configured to:

obtain a voice signal in the ambient sound, and segment the voice signal;

perform clustering processing on segmented voice signals, to determine a quantity of speakers; and if the quantity of speakers exceeds a fourth preset value, determine that the key sound detection sensitivity is a second value.

According to a fourth aspect, an embodiment of the present disclosure provides a headset, including:

a determining module, configured to determine that key sound detection sensitivity of a headset is a first value, where the first value is determined based on a request sent by a user for improving the key sound detection sensitivity of the headset;

a detection module, configured to collect environment information, and perform key sound detection in the environment information based on the first value; and a processing module, configured to: if a key sound exists in the environment information, adjust the headset to a hear through mode, or play the key sound.

In this embodiment, the key sound in the collected environment information is detected based on the determined key sound detection sensitivity. If the key sound exists, the headset is adjusted to the hear through mode, or the key sound is played. In this solution, the key sound detection is performed based on the manually adjusted key sound detection sensitivity. Based on this solution, the key sound detection sensitivity is adjusted based on a user requirement, so that user experience can be improved.

According to a fifth aspect, an embodiment of the present disclosure provides a headset control apparatus, including a processor and a memory. The memory is configured to store program code, and the processor is configured to invoke the program code, to perform the method according to any one of the possible implementations of the first aspect and/or any one of the possible implementations of the second aspect.

According to a sixth aspect, an embodiment of the present disclosure provides a computer-readable storage medium. The computer-readable storage medium stores a computer program, and the computer program is executed by a processor, to perform the method according to any one of the possible implementations of the first aspect and/or any one of the possible implementations of the second aspect.

According to a seventh aspect, an embodiment of the present disclosure provides a computer program product. When the computer program product runs on a computer, the computer is enabled to perform the method according to any one of the possible implementations of the first aspect and/or any one of the possible implementations of the second aspect.

It may be understood that the headset according to the third aspect, the headset according to the fourth aspect, the headset control apparatus according to the fifth aspect, the computer-readable storage medium according to the sixth aspect, or the computer program product according to the seventh aspect provided above are all configured to perform the method according to any one of the possible implementations of the first aspect and the method according to any one of the possible implementations of the second aspect. Therefore, for beneficial effects that can be achieved by the headset according to the third aspect, the headset according to the fourth aspect, the headset control apparatus according to the fifth aspect, the computer-readable storage medium according to the sixth aspect, or the computer program product according to the seventh aspect, refer to the beneficial effects in the corresponding method. Details are not described herein again.

BRIEF DESCRIPTION OF DRAWINGS

The following describes accompanying drawings used in embodiments of the present disclosure.

DESCRIPTION OF EMBODIMENTS

The following describes embodiments of the present disclosure with reference to the accompanying drawings in embodiments of the present disclosure. Terms used in implementations of embodiments of the present disclosure are merely used to explain specific embodiments of the present disclosure, and are not intended to limit the present disclosure.

It should be noted that key sound detection sensitivity in embodiments of the present disclosure may be key sound detection duration, or may be another physical parameter, for example, may be a period from a time when a key sound is detected to a time when a mode is switched. This is not specifically limited in this solution.

Figure 1:
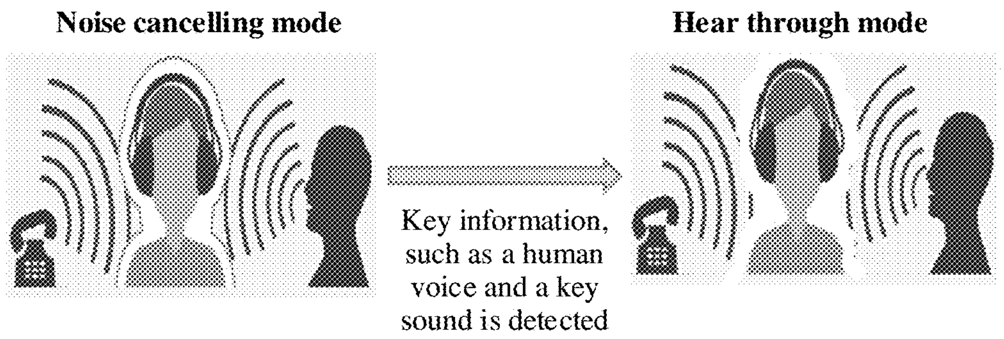
FIG. 1 is a diagram of an example application scenario of headset control according to an embodiment of the present disclosure.

FIG. 1 is a diagram of an application scenario of headset control according to an embodiment of the present disclosure. As shown in FIG. 1, a headset works in a noise cancelling mode. The headset may determine key sound detection sensitivity based on an environment in which a user is located, and then detect an ambient sound based on the key sound detection sensitivity. When the headset detects key information (for example, a key sound like a human voice, an alarm, a station report, or a horn sound), the headset is switched from the noise cancelling mode to a hear through mode.

In the diagram, only the hear through mode is used as an example for description, and the key sound may alternatively be played. This is not specifically limited in this solution.

The headset in embodiments of the present disclosure may be a headphone, an earphone, or another device (for example, AR glasses, VR glasses, or smart glasses) having audio collection and playing functions. The headset may work independently, or may work by connecting to a terminal device (for example, a mobile phone, a tablet, or smart glasses) in a wireless or wired manner. This is not specifically limited in this solution.

Figure 2:
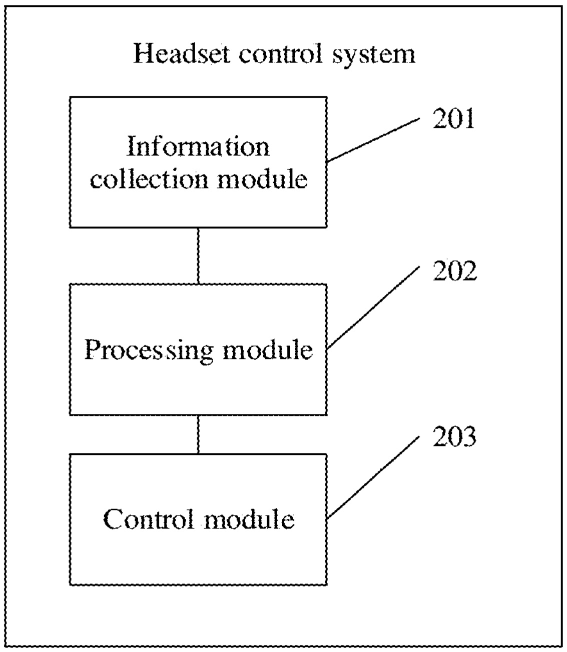
FIG. 2 is a diagram of an example headset control system according to an embodiment of the present disclosure.

FIG. 2 is a diagram of a headset control system according to an embodiment of the present disclosure. As shown in FIG. 2, a headset includes an information collection module 201, a processing module 202, and a control module 203.

The information collection module 201 may be a voice signal sensor like a microphone, and is configured to collect an audio signal in an environment. The information collection module 201 may alternatively be a positioning sensor like a GPS, and is configured to collect current location information of a user. The information collection module 201 may alternatively be an image sensor, and is configured to collect an environmental image. Certainly, the information collection module 201 may alternatively be another sensor or the like. This is not specifically limited in this solution.

The information collection module 201 may be located in the headset, or may be located in a terminal device connected to the headset.

The processing module 202 is configured to process information collected by the information collection module 201, for example, determine key sound detection sensitivity based on environment information collected by the information collection module 201, and perform key sound detection in the environment information based on the key sound detection sensitivity. The processing module 202 may be located in the headset, or may be located in the terminal device connected to the headset. This is not specifically limited in this solution.

The control module 203 is configured to control the headset based on a result of the processing module 202, for example, when the key sound is detected, switch the headset from a noise cancelling mode to a hear through mode, or play the key sound. The control module may be located in the headset.

Figure 3:
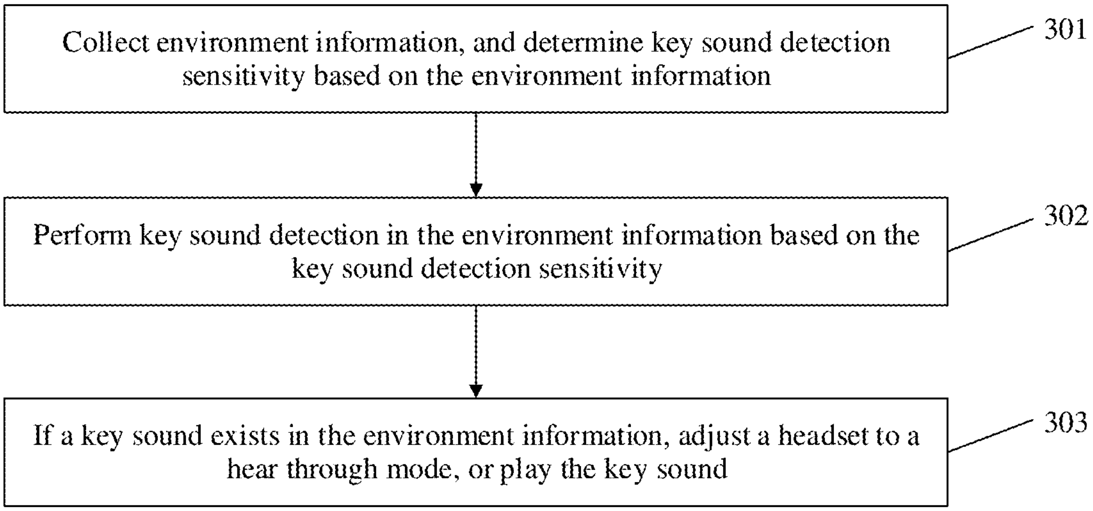
FIG. 3 is a schematic flowchart of an example headset control method according to an embodiment of the present disclosure.

FIG. 3 is a schematic flowchart of an example headset control method according to an embodiment of the present disclosure. As shown in FIG. 3, the method includes 301 to 303, which are specifically as follows:

301: Collect environment information, and determine key sound detection sensitivity based on the environment information.

The environment information may be, for example, an audio signal, a location of a user, or an image. This is not specifically limited in this solution.

A headset collects the environment information, and determines the key sound detection sensitivity based on the environment information.

The headset may detect a user scenario based on the collected environment information, and adjust the key sound detection sensitivity based on the user scenario.

For example, if the collected audio signal is far away from the user, it indicates that the audio is not closely related to the user, and the key sound detection sensitivity may be reduced.

For example, the key sound detection sensitivity may be that a detection result is generated every 10 ms or 30 ms, or a detection result is generated every 50 ms. This is not specifically limited in this solution. Alternatively, the key sound detection sensitivity may be a period from a time when a key sound is detected to a time when a mode is switched. This is not specifically limited in this solution.

302: Perform key sound detection in the environment information based on the key sound detection sensitivity.

A key sound in the environment information is detected based on the determined key sound detection sensitivity.

In an implementation, a basic detection algorithm is trained by using a model. For example, a detection result may be generated every 10 ms (a basic frame). Specifically, a support vector machine (SVM) is a generalized linear classifier that performs binary classification on data in a supervised learning manner, and a decision boundary of the support vector machine is a maximum-margin hyperplane for solving learning samples. Therefore, the SVM technology may be used. Alternatively, a random forest technology may be used. A random forest is a classifier that uses a plurality of trees to train and predict samples.

In another implementation, if the key sound detection sensitivity is low, that is, detection is delayed, results of a plurality of basic frames may be detected jointly. For example, in a specified time period (for example, M=30 ms or 50 ms), more than half of detection frames (for example, N=M/2) are key sounds, it is determined that a detection result in this time period is a key sound, and a key sound detection success mark is output.

Specifically, preprocessing is performed first.

The collected audio signal is framed and windowed. Fast Fourier transform (FFT) is performed frame by frame, that is, short-time Fourier transform (STFT) calculation is performed. A Hann window is used. A frame length and an FFT length are both 512, and a frame shift is 160 (10 ms). During detection, an FFT amplitude spectrum of one frame of signal can be obtained each time of calculation and used for subsequent feature calculation.

Then, a feature parameter is extracted.

A logarithmic Mel spectrum feature is calculated based on an amplitude spectrum of a corresponding frame obtained through preprocessing.

The process is as follows:

(1) set a Mel spectrum range (300 Hz to 6000 Hz), use a 48-dimensional Mel spectrum, and calculate a Mel weighting coefficient matrix W based on 512-point FFT; and (2) calculate W*S based on an STFT matrix S obtained in the preprocessing stage, to obtain a feature of the corresponding frame, add an offset 1e−5, and take a logarithm, to obtain a 48-dimensional vector of a logarithmic Mel spectrum.

Classifier based on the feature parameter obtained through calculation, perform classification and determine whether a sound is a key sound.

A specific process is as follows:

Based on an SVM Algorithm

An SVM, which is an abbreviation of support vector machine, can use linear kernels for classification. Due to a small computation amount of the SVM, the SVM can be used as a front-end classifier or used to train a plurality of classifiers for joint determining. A decision function of a linear kernel function SVM is:

$$f(x) = \operatorname{sign}\left(\sum_{i=1}^{N} \alpha_i x_i + b\right)$$

Whether a sound is a key sound is determined based on whether a predicted value f(x) obtained by calculating an input feature x is 1. It may be obtained through analysis that, when an input is a 48-dimensional feature vector, only 48 multiplications and 48 additions are required for a linear SVM classifier to perform determining. Parameters $a_i$ and b are obtained by selecting some training data for training.

The 48-dimensional feature vector is input into the foregoing formula, and a final predicted value is calculated. If the predicted value is greater than 0, it is considered that the sound is a key sound. If the predicted value is less than 0, it is considered that the sound is not a key sound.

Based on a Random Forest Algorithm

1. Z samples are randomly selected with replacement from Z samples in training data (one sample is randomly selected each time, and then the sample is put back for subsequent selection). The selected Z samples are used to train a decision tree, and used as samples at a root node of the decision tree.
2. Each sample has 48 dimensional features. When each node in the decision tree needs to be split, 6 dimensional features are randomly selected from the 48 dimensional features. Then, a specific policy (for example, an information gain) is used for the 6 dimensional features to select 1 dimensional feature as a split attribute of the node.
3. In a process of forming the decision tree, each node needs to be split based on step 2 (If an attribute selected for the node next time is an attribute used when a parent node is split, the node is a leaf node and does not need to be split) until the node cannot be split again. No pruning is performed in the entire process of forming the decision tree.
4. A large quantity of decision trees are created based on steps 1 to 3. In this way, a random forest is formed.

The 48-dimensional feature vector is input to the formed random forest for determining. Finally, a probability value is obtained and a threshold is defined. If the value is greater than the threshold, it is considered that the sound is a key sound. Otherwise, it is considered that the sound is not a key sound.

303: If the key sound exists in the environment information, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset collects the environment information, determines the key sound detection sensitivity based on the environment information, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the environment information, to perform key sound detection. Based on this solution, the key sound detection sensitivity may be different in different scenarios, so that user experience can be improved.

Figure 4:
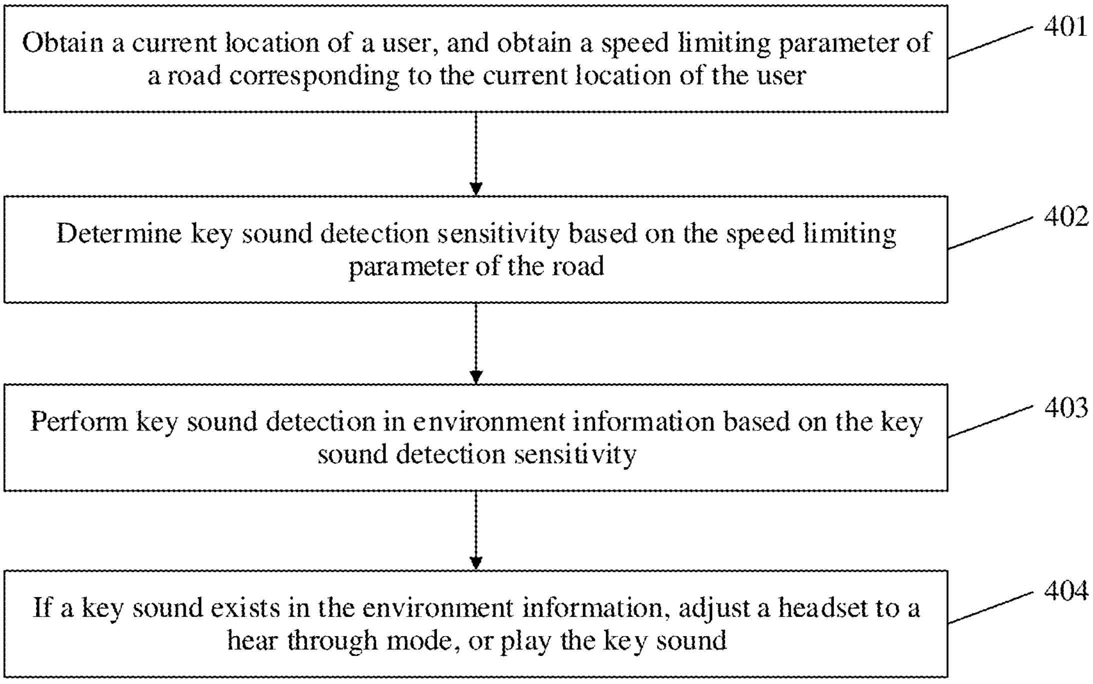
FIG. 4 is a schematic flowchart of another example headset control method according to an embodiment of the present disclosure.

FIG. 4 is a schematic flowchart of another example headset control method according to an embodiment of the present disclosure. As shown in FIG. 4, the method includes 401 to 404, as follows:

401: Obtain a current location of a user, and obtain a speed limit parameter of a road corresponding to the current location of the user.

For example, a headset collects current location information of the user by using a positioning sensor (for example, a GPS) of an information collection module, and may further query speed limit information of the current road by using a map.

402: Determine key sound detection sensitivity based on the speed limit parameter of the road.

If a driving speed indicated by the speed limit parameter of the road exceeds a first preset value, the key sound detection sensitivity is a first value.

If a driving speed indicated by the speed limit parameter of the road is less than the first preset value, the key sound detection sensitivity is a second value.

Specifically, if a speed limit is high, the road may be a highway, and the detection sensitivity may be improved (for example, a detection result is generated every 30 ms). If a speed limit is low, the road may be an urban road, and the detection sensitivity may be reduced (for example, a detection result is generated every 50 ms).

403: Perform key sound detection in environment information based on the key sound detection sensitivity.

For an implementation of this step, refer to the embodiment shown in FIG. 3. Details are not described herein again.

404: If a key sound exists in the environment information, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset obtains the current location of the user, obtains the speed limit parameter of the road corresponding to the current location of the user, determines the key sound detection sensitivity based on the speed limit parameter of the road, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the speed limit parameter of the road corresponding to the current location of the user, to perform key sound detection. Based on this solution, an audio playing delay may be adaptively adjusted based on the road speed limit, so that the key sound detection sensitivity may be different in different scenarios, and user experience can be improved.

Figure 5:
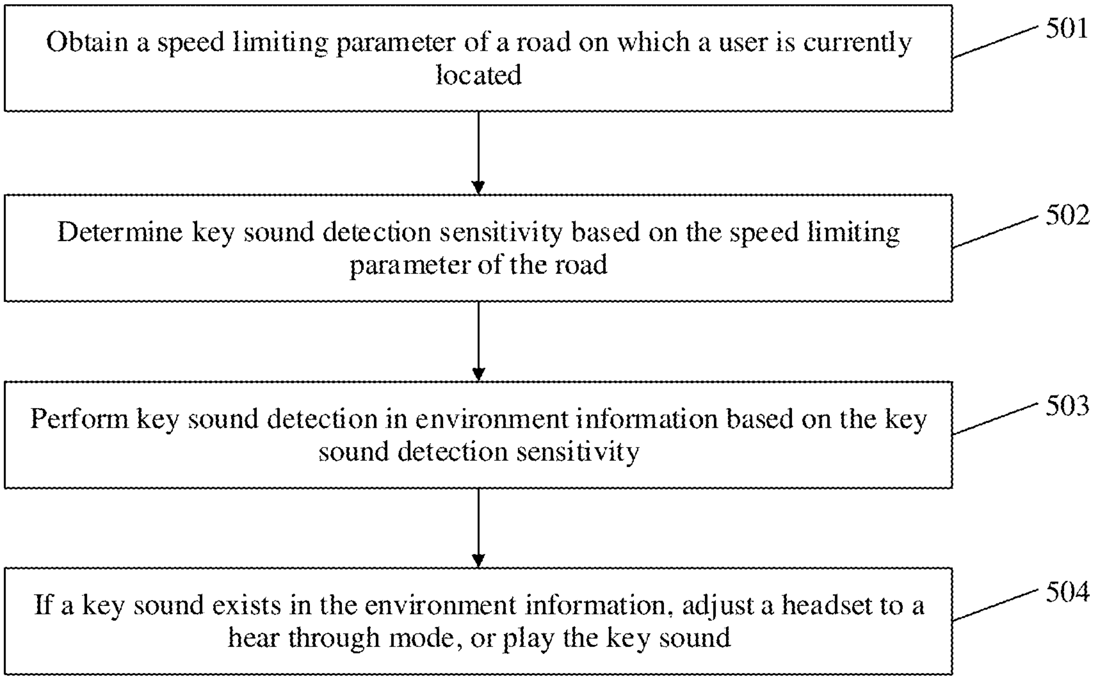
FIG. 5 is a schematic flowchart of an example headset control method according to an embodiment of the present disclosure.

FIG. 5 is a schematic flowchart of another headset control method according to an embodiment of the present disclosure. As shown in FIG. 5, the method includes 501 to 504, which are specifically as follows:

501: Obtain a speed limit parameter of a road on which a user is currently located.

For example, a headset collects, by using an image sensor of an information collection module, an image of the road on which the user is currently located, and may obtain traffic sign information by processing the image, to obtain speed limit information of the current road.

502: Determine key sound detection sensitivity based on the speed limit parameter of the road.

If a driving speed indicated by the speed limit parameter of the road exceeds a first preset value, the key sound detection sensitivity is a first value.

If a driving speed indicated by the speed limit parameter of the road is less than the first preset value, the key sound detection sensitivity is a second value.

Specifically, if a speed limit is high, the road may be a highway, and the detection sensitivity may be improved (for example, a detection result is generated every 30 ms). If a speed limit is low, the road may be an urban road, and the detection sensitivity may be reduced (for example, a detection result is generated every 50 ms).

503: Perform key sound detection in environment information based on the key sound detection sensitivity.

For an implementation of this step, refer to the embodiment shown in FIG. 3. Details are not described herein again.

504: If a key sound exists in the environment information, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset directly obtains the speed limit parameter of the road on which the user is currently located, determines the key sound detection sensitivity based on the speed limit parameter of the road, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the speed limit parameter of the road corresponding to the current location of the user, to perform key sound detection. Based on this solution, an audio playing delay may be adaptively adjusted based on the road speed limit, so that the key sound detection sensitivity may be different in different scenarios, and user experience can be improved.

Figure 6:
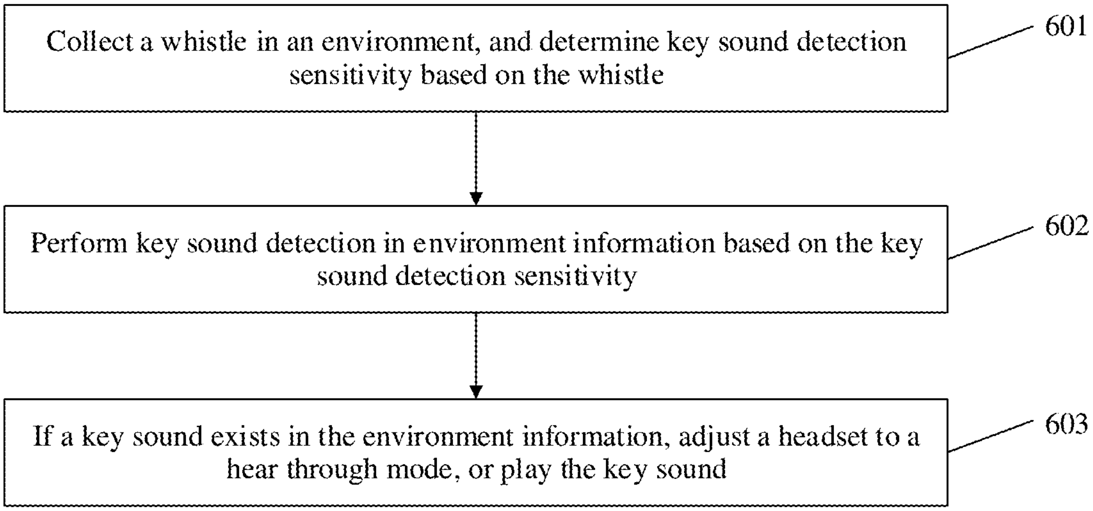
FIG. 6 is a schematic flowchart of an example headset control method according to an embodiment of the present disclosure.

FIG. 6 is a schematic flowchart of another example headset control method according to an embodiment of the present disclosure. As shown in FIG. 6, the method includes 601 to 603, which are specifically as follows:

601: Collect a horn sound in an environment, and determine key sound detection sensitivity based on the horn sound.

For example, a headset collects the horn sound in the environment by using a microphone of an information collection module.

If the horn sound is a horn sound of a first preset vehicle, the key sound detection sensitivity is a first value; or if the horn sound is a horn sound of a second preset vehicle, the key sound detection sensitivity is a second value. The first preset vehicle may be, for example, a police car, a fire truck, or an ambulance, and the second preset vehicle may be, for example, a common vehicle. The first value is less than the second value.

The collected horn sound is input into a pre-trained SVM or neural network model to identify whether the vehicle is a police car, a fire truck, an ambulance, or common vehicle. For example, if the vehicle is a police car, a fire truck, or an ambulance, the detection sensitivity can be improved (for example, a detection result is generated every 10 ms). If the vehicle is a common vehicle, the detection sensitivity can be reduced (for example, a detection result is generated every 30 ms). The foregoing is merely an example, and this is not specifically limited in this solution.

602: Perform key sound detection in environment information based on the key sound detection sensitivity.

For an implementation of this step, refer to the embodiment shown in FIG. 3. Details are not described herein again.

603: If a key sound exists in the environment information, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset directly obtains the horn sound in an environment, determines the key sound detection sensitivity based on the horn sound, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the horn sound, to perform key sound detection. Based on this solution, an audio playing delay may be adaptively adjusted based on the horn sound, so that the key sound detection sensitivity may be different in different scenarios, and user experience can be improved.

Figure 7:
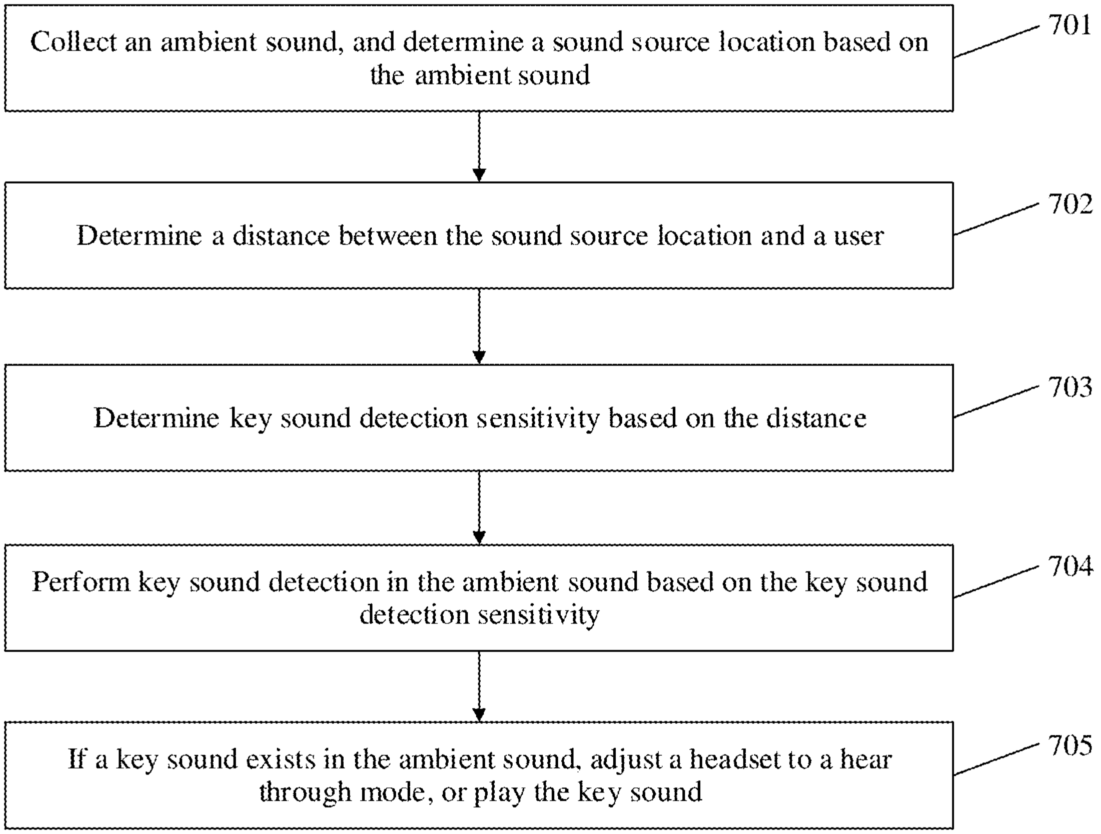
FIG. 7 is a schematic flowchart of an example headset control method according to an embodiment of the present disclosure.

FIG. 7 is a schematic flowchart of still another example headset control method according to an embodiment of the present disclosure. As shown in FIG. 7, the method includes 701 to 705, which are specifically as follows:

701: Collect an ambient sound, and determine a sound source location based on the ambient sound.

For example, a headset collects the ambient sound by using a microphone of an information collection module.

Based on the collected ambient sound, an information processing module performs sound source positioning by using a method such as beamforming or a time difference of arrival (TDOA), to obtain a sound source distance.

702: Determine a distance between the sound source location and a user.

703: Determine key sound detection sensitivity based on the distance.

If the distance is short, the detection sensitivity can be improved (for example, a detection result is generated every 10 ms). If the distance is long, the detection sensitivity can be reduced (for example, a detection result is generated every 30 ms).

704: Perform key sound detection in the ambient sound based on the key sound detection sensitivity.

For an implementation of this step, refer to the embodiment shown in FIG. 3. Details are not described herein again.

705: If a key sound exists in the ambient sound, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset directly obtains the ambient sound, determines the key sound detection sensitivity based on the distance between the sound source location and the user, and performs key sound detection in environment information based on the key sound detection sensitivity. If the key sound exists, the headset is adjusted to the hear through mode, or the key sound is played. In this solution, the key sound detection sensitivity corresponding to the environment information is determined based on the distance between the sound source location and the user, to perform key sound detection. Based on this solution, an audio playing delay may be adaptively adjusted based on the distance, so that the key sound detection sensitivity may be different in different scenarios, and user experience can be improved.

Figure 8:
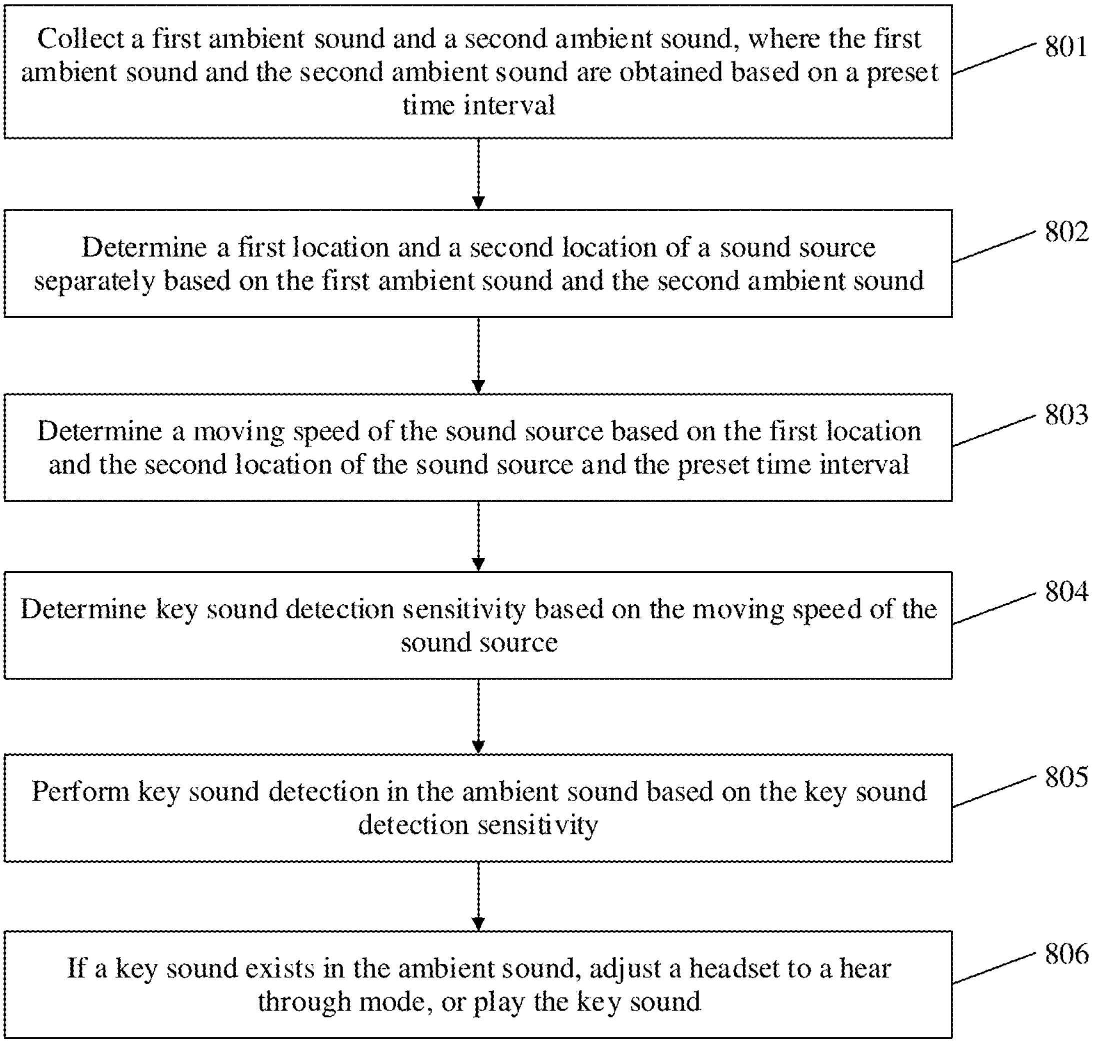
FIG. 8 is a schematic flowchart of an example headset control method according to an embodiment of the present disclosure.

FIG. 8 is a schematic flowchart of still another example headset control method according to an embodiment of the present disclosure. As shown in FIG. 8, the method includes 801 to 806, which are specifically as follows:

801: Collect a first ambient sound and a second ambient sound, where the first ambient sound and the second ambient sound are obtained based on a preset time interval.

For example, a headset collects the ambient sound based on the preset time interval by using a microphone of an information collection module.

In this embodiment, only an example in which the ambient sound is obtained twice is used for description. Alternatively, the ambient sound may be collected a plurality of times. This is not specifically limited in this solution.

802: Determine a first location and a second location of a sound source separately based on the first ambient sound and the second ambient sound.

Based on the collected ambient sound, an information processing module performs sound source positioning by using a method such as beamforming or a time difference of arrival (TDOA).

803: Determine a moving speed of the sound source based on the first location and the second location of the sound source and the preset time interval.

The moving speed of the sound source may be obtained based on the time interval and a difference between distances to the first location and the second location of the sound source.

804: Determine key sound detection sensitivity based on the moving speed of the sound source.

If the speed is fast, the detection sensitivity can be improved (for example, a detection result is generated every 10 ms). If the speed is slow, the detection sensitivity can be reduced (for example, a detection result is generated every 30 ms).

805: Perform key sound detection in the ambient sound based on the key sound detection sensitivity.

For an implementation of this step, refer to the embodiment shown in FIG. 3. Details are not described herein again.

806: If a key sound exists in the ambient sound, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset obtains an ambient sound a plurality of times, determines the moving speed of the sound source, determines the key sound detection sensitivity based on the moving speed of the sound source, and performs key sound detection in environment information based on the key sound detection sensitivity. If the key sound exists, the headset is adjusted to the hear through mode, or the key sound is played. In this solution, the key sound detection sensitivity corresponding to the environment information is determined based on the moving speed of the sound source, to perform key sound detection. Based on this solution, an audio playing delay may be adaptively adjusted based on the moving speed of the sound source, so that the key sound detection sensitivity may be different in different scenarios, and user experience can be improved.

Figure 9:
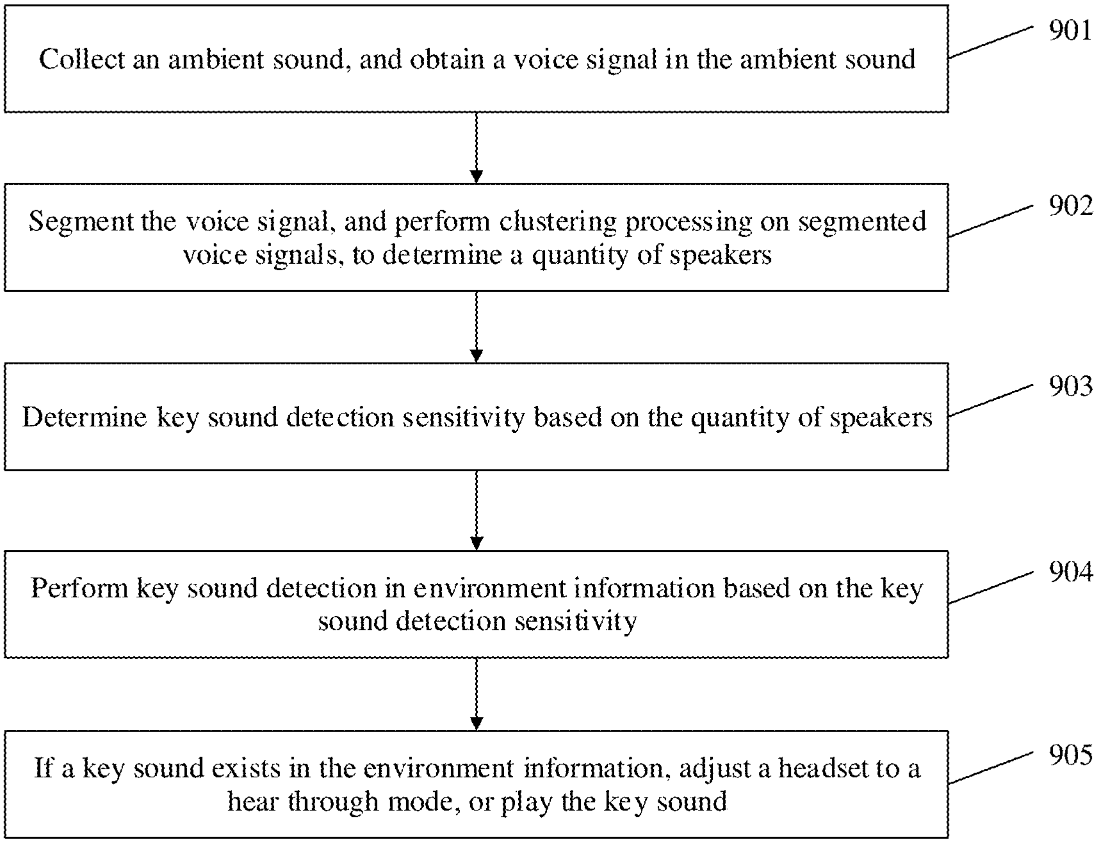
FIG. 9 is a schematic flowchart of an example headset control method according to an embodiment of the present disclosure.

FIG. 9 is a schematic flowchart of still another example headset control method according to an embodiment of the present disclosure. As shown in FIG. 9, the method includes 901 to 905, which are specifically as follows:

901: Collect an ambient sound, and obtain a voice signal in the ambient sound.

For example, a headset collects the ambient sound by using a microphone of an information collection module.

902: Segment the voice signal, and perform clustering processing on segmented voice signals, to determine a quantity of speakers.

The voice signal in the ambient sound is segmented, so that a voice corresponding to the speaker is segmented, and then segmented voice signals are clustered based on a Bayesian information criterion, to finally determine the quantity of speakers.

903: Determine key sound detection sensitivity based on the quantity of speakers.

If the quantity of speakers is large, security is high, and the detection sensitivity can be reduced (for example, a detection result is generated every 30 ms). If the quantity of speakers is small, security is low, and the detection sensitivity can be improved (for example, a detection result is generated every 10 ms).

904: Perform key sound detection in environment information based on the key sound detection sensitivity.

For an implementation of this step, refer to the embodiment shown in FIG. 3. Details are not described herein again.

905: If a key sound exists in the environment information, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the headset directly obtains the voice signal in the ambient sound, determines the quantity of speakers based on the voice signal, determines the key sound detection sensitivity based on the quantity of speakers, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the quantity of speakers, to perform key sound detection. Based on this solution, an audio playing delay may be adaptively adjusted based on the quantity of speakers, so that the key sound detection sensitivity may be different in different scenarios, and user experience can be improved.

Figure 10:
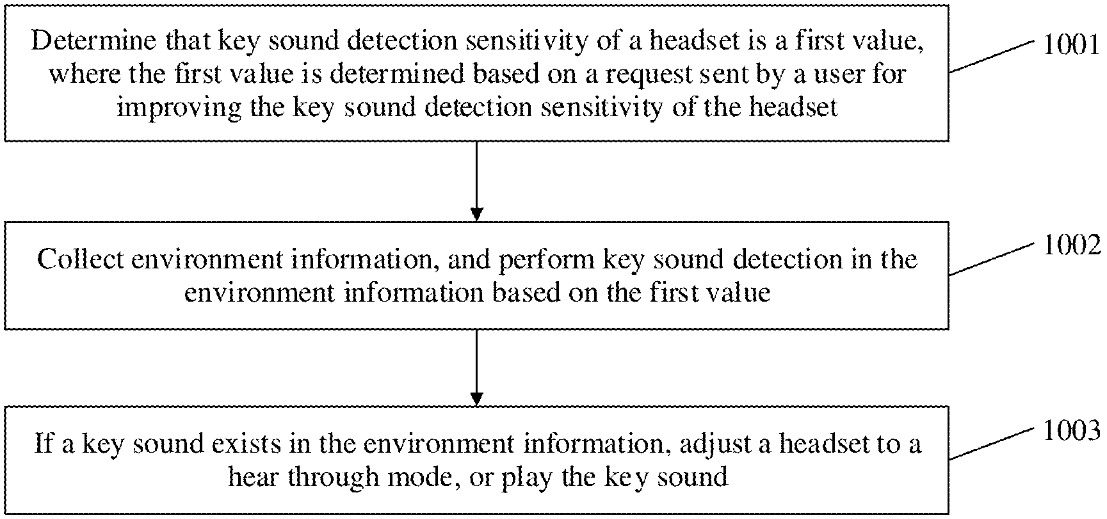
FIG. 10 is a schematic flowchart of an example headset control method according to an embodiment of the present disclosure.

FIG. 10 is a schematic flowchart of an example headset control method according to an embodiment of the present disclosure. As shown in FIG. 10, the method includes 1001 to 1003, which are specifically as follows:

1001: Determine that key sound detection sensitivity of a headset is a first value, where the first value is determined based on a request sent by a user for improving the key sound detection sensitivity of the headset.

In other words, the solution is based on manually set key sound detection sensitivity.

Specifically, the key sound detection sensitivity may be expressed as M*x. If the key sound detection sensitivity needs to be improved, a multiplication factor x of M is decreased. If the key sound detection sensitivity needs to be reduced, a multiplication factor x of M is increased. For example, a range of x is from 0.5 to 1.

Specifically, M may be 30 ms, 50 ms, or the like.

Further, the key sound detection sensitivity may be expressed as N*y. If the key sound detection sensitivity needs to be improved, a multiplication factor y of N may be reduced. If the key sound detection sensitivity needs to be reduced, a multiplication factor y of N is increased. For example, a range of y is from 0.5 to 1.

Specifically, N may be M/2. Certainly, the representation is merely an example, and may alternatively be in another form. This is not specifically limited in this solution.

M is not less than N, and both M and N are not less than 1.

1002: Collect environment information, and perform key sound detection in the environment information based on the first value.

The environment information may be the audio signal, the location of the user, or the image in the foregoing embodiments. This is not specifically limited in this solution.

1003: If a key sound exists in the environment information, adjust the headset to a hear through mode, or play the key sound.

If the key sound is detected, a control module of the headset is switched from a noise cancelling mode to the hear through mode, to reduce a volume of a sound played in the headset, so that the user can hear the key sound in an environment.

Alternatively, if the key sound is detected, a control module of the headset controls playing of the key sound, so that the user can clearly hear the key sound in the environment. Optionally, in this case, content originally played in the headset may stop playing, or a volume of the originally played sound may be reduced.

In this embodiment, the key sound in the collected environment information is detected based on the determined key sound detection sensitivity. If the key sound exists, the headset is adjusted to the hear through mode, or the key sound is played. In this solution, the key sound detection is performed based on the manually adjusted key sound detection sensitivity. Based on this solution, the key sound detection sensitivity is adjusted based on a user requirement, so that user experience can be improved.

Figure 11:
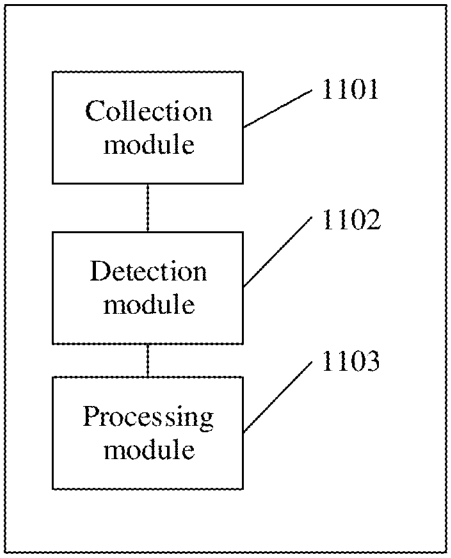
FIG. 11 is a diagram of a structure of an example headset according to an embodiment of the present disclosure.

FIG. 11 is a diagram of a structure of an example headset according to an embodiment of the present disclosure. As shown in FIG. 11, the headset may include a collection module 1101, a detection module 1102, and a processing module 1103.

The collection module 1101 is configured to: collect environment information, and determine key sound detection sensitivity based on the environment information.

The detection module 1102 is configured to perform key sound detection in the environment information based on the key sound detection sensitivity.

The processing module 1103 is configured to: if a key sound exists in the environment information, adjust the headset to a hear through mode, or play the key sound.

In this embodiment, the headset collects the environment information, determines the key sound detection sensitivity based on the environment information, and performs key sound detection in the environment information based on the key sound detection sensitivity. If the key sound exists, the headset is adjusted to the hear through mode, or the key sound is played. In this solution, the key sound detection sensitivity corresponding to the environment information is determined based on the environment information, to perform key sound detection. Based on this solution, the key sound detection sensitivity may be different in different scenarios, so that user experience can be improved.

In an implementation, the environment information includes a current location of a user, and the collection module 1101 is configured to:

- obtain a speed limit parameter of a road corresponding to the current location of the user; and
- if a driving speed indicated by the speed limit parameter of the road exceeds a first preset value, determine that the key sound detection sensitivity is a first value.

In this embodiment, the headset obtains the current location of the user, obtains the speed limit parameter of the road corresponding to the current location of the user, determines the key sound detection sensitivity based on the speed limit parameter of the road, and performs key sound detection in the environment information based on the key sound detection sensitivity. If this key sound exists, the headset is adjusted to the hear through mode, or the key sound is played. In this solution, the key sound detection sensitivity corresponding to the environment information is determined based on the speed limit parameter of the road corresponding to the current location of the user, to perform key sound detection. Based on this solution, an audio playing delay may be adaptively adjusted based on the road speed limit, so that the key sound detection sensitivity may be different in different scenarios, and user experience can be improved.

In another implementation, the environment information includes a speed limit parameter of a road on which a user is currently located, and the collection module 1101 is configured to:

- if a driving speed indicated by the speed limit parameter of the road exceeds a first preset value, determine that the key sound detection sensitivity is a first value.

In still another implementation, the environment information includes a horn sound, and the collection module 1101 is configured to:

- if the horn sound is a horn sound of a first preset vehicle, determine that the key sound detection sensitivity is a first value.

In another implementation, the environment information includes an ambient sound, and the collection module 1101 is configured to:

- determine a sound source location based on the ambient sound;
- determine a distance between the sound source location and a user; and
- if the distance is less than a second preset value, determine that the key sound detection sensitivity is a first value.

In still another implementation, the environment information includes a first ambient sound and a second ambient sound, the first ambient sound and the second ambient sound are obtained based on a preset time interval, and the collection module 1101 is configured to:

- determine a first location and a second location of a sound source separately based on the first ambient sound and the second ambient sound;
- determine a moving speed of the sound source based on the first location and the second location of the sound source and the preset time interval; and if the moving speed exceeds a third preset value, determine that the key sound detection sensitivity is a first value.

In yet another implementation, the environment information includes an ambient sound, and the collection module 1101 is configured to:

obtain a voice signal in the ambient sound, and segment the voice signal;

perform clustering processing on segmented voice signals, to determine a quantity of speakers; and if the quantity of speakers exceeds a fourth preset value, determine that the key sound detection sensitivity is a second value.

Figure 12:
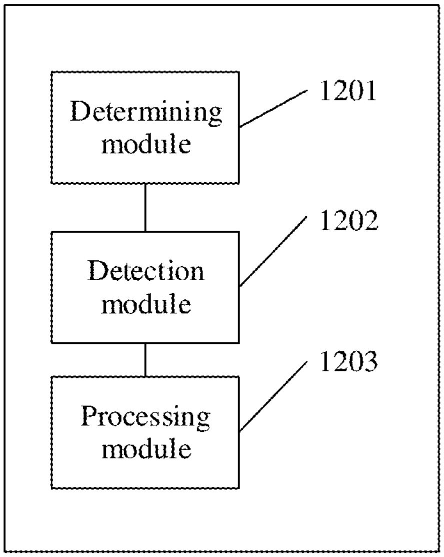
FIG. 12 is a diagram of a structure of another example headset according to an embodiment of the present disclosure.

FIG. 12 is a diagram of a structure of another example headset according to an embodiment of the present disclosure. As shown in FIG. 12, the headset may include a determining module 1201, a detection module 1202, and a processing module 1203.

The determining module 1201 is configured to determine that key sound detection sensitivity of a headset is a first value, where the first value is determined based on a request sent by a user for improving the key sound detection sensitivity of the headset.

The detection module 1202 is configured to collect environment information, and perform key sound detection in the environment information based on the first value.

The processing module 1203 is configured to: if a key sound exists in the environment information, adjust the headset to a hear through mode, or play the key sound.

In this embodiment, the key sound in the collected environment information is detected based on the determined key sound detection sensitivity. If the key sound exists, the headset is adjusted to the hear through mode, or the key sound is played. In this solution, the key sound detection is performed based on the manually adjusted key sound detection sensitivity. Based on this solution, the key sound detection sensitivity is adjusted based on a user requirement, so that user experience can be improved.

It should be noted that, for a specific function implementation of the headset, refer to the descriptions of the headset control method, and details are not described herein again. All units or modules in the headset may be separately or together combined into one or more other units or modules, or one or more units or modules thereof may be split into a plurality of functionally smaller units or modules. This can implement same operations without affecting implementation of technical effects of embodiments of the present invention. The foregoing units or modules are divided based on logical functions. During actual application, functions of one unit (or module) may be implemented by a plurality of units (or modules), or functions of a plurality of units (or modules) may be implemented by one unit (or module).

Figure 13:
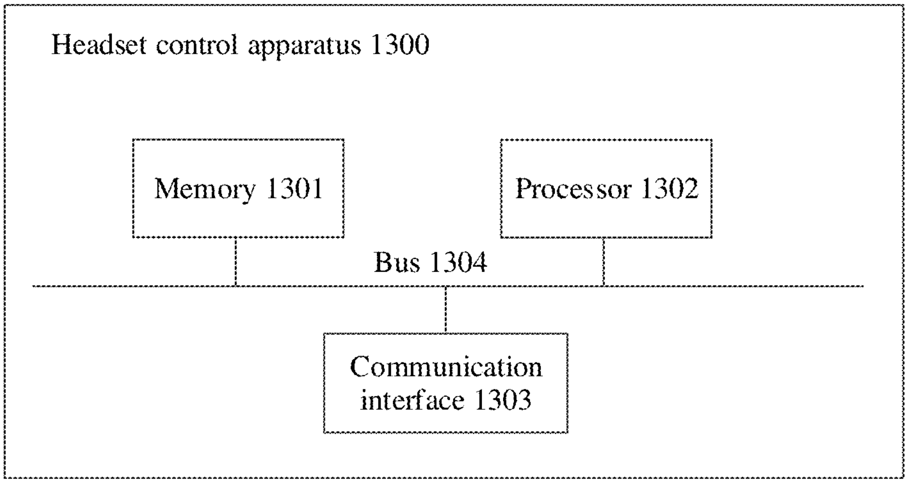
FIG. 13 is a diagram of a structure of an example headset control apparatus according to an embodiment of the present disclosure.

Based on the descriptions of the foregoing method embodiments and apparatus embodiments, an embodiment of the present invention further provides a headset control apparatus. FIG. 13 is a diagram of a structure of a headset control apparatus according to an embodiment of the present invention. The headset control apparatus 1300 (the apparatus 1300 may be a computer device) shown in FIG. 13 includes a memory 1301, a processor 1302, a communication interface 1303, and a bus 1304. Communication connections between the memory 1301, the processor 1302, and the communication interface 1303 are implemented through the bus 1304.

The memory 1301 may be a read-only memory (ROM), a static storage device, a dynamic storage device, or a random access memory (RAM).

The memory 1301 may store a program. When the program stored in the memory 1301 is executed by the processor 1302, the processor 1302 and the communication interface 1303 are configured to perform steps of the headset control method in embodiments of the present disclosure.

The processor 1302 may be a general-purpose central processing unit (CPU), a microprocessor, an application-specific integrated circuit (ASIC), a graphics processing unit (GPU), or one or more integrated circuits, and is configured to execute a related program, to implement a function to be performed by a unit in the headset control apparatus in this embodiment, or perform the headset control method in the method embodiments of the present disclosure.

The processor 1302 may be an integrated circuit chip and has a signal processing capability. In an implementation process, steps of the headset control method in the present disclosure may be completed by using a hardware integrated logic circuit in the processor 1302 or by using instructions in a form of software. The processor 1302 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logical block diagrams disclosed in embodiments of the present disclosure. The general-purpose processor may be a microprocessor, or the processor may be any conventional processor or the like. Steps of the methods disclosed with reference to embodiments of the present disclosure may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1301. The processor 1302 reads information in the memory 1301, and completes, in combination with hardware of the processor 1302, functions to be performed by the units included in the headset control apparatus in this embodiment, or performs the headset control method in the method embodiments of the present disclosure.

The communication interface 1303 uses, for example, but not limited to, a transceiver-like apparatus, to implement communication between the apparatus 1300 and another device or a communication network. For example, data may be obtained through the communication interface 1303.

The bus 1304 may include a path for information transmission between various components (for example, the memory 1301, the processor 1302, and the communication interface 1303) of the apparatus 1300.

It should be noted that although the apparatus 1300 shown in FIG. 13 shows only the memory, the processor, and the communication interface, in a specific implementation process, a person skilled in the art should understand that the apparatus 1300 further includes another component necessary for normal operation. In addition, based on a specific requirement, a person skilled in the art should understand that the apparatus 1300 may further include a hardware component for implementing another additional function. In addition, a person skilled in the art should understand that the apparatus 1300 may alternatively include only a component required for implementing this embodiment, and does not need to include all components shown in FIG. 13.

An embodiment of the present disclosure further provides a driver chip. The driver chip includes a processor and a data interface. The processor reads, through the data interface, instructions stored in a memory, to implement the headset control method.

Optionally, in an implementation, the chip may further include the memory. The memory stores instructions. The processor is configured to execute the instructions stored in the memory. When the instructions are executed, the processor is configured to implement the headset control method.

An embodiment of the present disclosure further provides a computer-readable storage medium. The computer-readable storage medium stores instructions. When the instructions are run on a computer or a processor, the computer or the processor is enabled to perform one or more steps in any one of the foregoing methods.

An embodiment of the present disclosure further provides a computer program product including instructions. When the computer program product is run on a computer or a processor, the computer or the processor is enabled to perform one or more steps in any one of the foregoing methods.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in the present disclosure. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically through lasers. Combinations of the above should also be included within the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in the present disclosure may be implemented in various apparatuses or devices, including a wireless handset, an integrated circuit (IC), or a set of ICs (for example, a chip set). Various components, modules, or units are described in the present disclosure to emphasize functional aspects of apparatuses configured to perform the disclosed techniques, but do not necessarily require realization by different hardware units. Actually, as described above, various units may be combined with appropriate software and/or firmware into an encoding hardware unit, or provided by an interoperable hardware unit (including one or more processors described above).

It may be clearly understood by a person skilled in the art that, for the purpose of convenient and brief description, for a detailed working process of the foregoing system, apparatus, and unit, refer to the specific description of a corresponding step process in the foregoing method embodiments. Details are not described herein again.

It should be understood that unless otherwise specified, "/" in descriptions of the present disclosure indicates an "or" relationship between associated objects. For example, A/B may indicate A or B. A and B may be singular or plural. In addition, in the descriptions of the present disclosure, "a plurality of" means two or more than two unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of the present disclosure, words such as "first" and "second" are used in embodiments of the present disclosure to distinguish between same items or similar items that have basically the same functions or purposes. A person skilled in the art may understand that the words such as "first" and "second" limit neither of a quantity and an execution sequence, and the words such as "first" and "second" do not indicate a definite difference either. In addition, in embodiments of the present disclosure, terms such as "example" or "for example" are used to represent giving an example, an illustration, or a description. Any embodiment or design scheme described as "example" or "for example" in embodiments of the present disclosure should not be construed as being more preferred or having more advantages than another embodiment or design scheme. Exactly, use of the terms such as "example" or "for example" is intended to present a related concept in a specific manner for ease of understanding.

In the several embodiments provided in the present disclosure, it should be understood that the disclosed system, apparatus, and method may be implemented in other manners. For example, division into the units is merely logical function division and may be another division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or other programmable apparatuses. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid-state disk (SSD).

The foregoing descriptions are merely specific implementations of embodiments of the present disclosure, but are not intended to limit the protection scope of embodiments of the present disclosure. Any variation or replacement within the technical scope disclosed in embodiments of the present disclosure shall fall within the protection scope of embodiments of the present disclosure. Therefore, the protection scope of embodiments of the present disclosure shall be subject to the protection scope of the claims.

What is claimed is:

1. A headset control method, comprising:

collecting environment information, and determining key sound detection sensitivity based on the environment information, the key sound detection sensitivity indicating sensitivity of detecting a predetermined sound, wherein the key sound detection sensitivity comprises a key sound detection duration;

performing detection of the predetermined sound in the environment information based on the key sound detection sensitivity; and upon detecting the predetermined sound in the environment information, adjusting a headset to a hear through mode in which the headset lets one or more ambient sounds in, or playing the predetermined sound, wherein determining the key sound detection sensitivity based on the environment information comprises:

determining that the key sound detection sensitivity is a first value when at least one of the following conditions is satisfied:

(1) a driving speed indicated by a speed limit parameter of a road corresponding to a current location of a user exceeds a first preset value;

(2) a driving speed indicated by a speed limit parameter of a road on which the user is currently located exceeds the first preset value;

(3) a horn sound in the environment information is a horn sound of a first preset vehicle;

(4) a distance between a sound source location determined based on an ambient sound and the user is less than a second preset value; or (5) a moving speed of a sound source determined based on a first ambient sound, a second ambient sound, and a preset time interval exceeds a third preset value, or determining that the key sound detection sensitivity is a second value when a quantity of speakers determined by performing clustering processing on segmented voice signals obtained from an ambient sound exceeds a fourth preset value.

2. The method according to claim 1, wherein the environment information comprises the current location of the user, and determining that the driving speed indicated by the speed limit parameter of the road corresponding to the current location of the user exceeds the first preset value comprise:

obtaining the current location of the user by using a positioning sensor;

obtaining, by querying map information based on the current location of the user, the speed limit parameter of a road corresponding to the current location of the user; and determining, based on the speed limit parameter of the road, the driving speed indicated by the speed limit parameter.

3. The method according to claim 1, wherein the environment information comprises the speed limit parameter of the road on which the user is currently located, and determining that the driving speed indicated by the speed limit parameter of the road on which the user is currently located exceeds the first preset value comprises:

collecting, by using an image sensor, an image of the road on which the user is currently located;

obtaining traffic sign information by processing the image;

obtaining the speed limit parameter of the road based on the traffic sign information, and determining, based on the speed limit parameter of the road, the driving speed indicated by the speed limit parameter.

4. The method according to claim 1, wherein the environment information comprises the horn sound, and determining that the horn sound in the environment information is the horn sound of the first preset vehicle comprises:

inputting the horn sound into a pre-trained support vector machine model or neural network model; and identifying, by the pre-trained support vector machine model or neural network model, whether a vehicle corresponding to the horn sound is the first preset vehicle.

5. The method according to claim 1, wherein the environment information comprises the ambient sound, and determining the distance between the sound source location determined based on the ambient sound and the user comprises:

performing sound source positioning based on the ambient sound by using beamforming or a time difference of arrival method to determine the sound source location; and determining the distance between the sound source location and the user.

6. The method according to claim 1, wherein the environment information comprises the first ambient sound and the second ambient sound obtained based on the preset time interval, determining the moving speed of the sound source based on the first ambient sound, the second ambient sound, and the preset time interval comprises:

determining a first location and a second location of the sound source separately based on the first ambient sound and the second ambient sound; and determining the moving speed of the sound source based on the first location and the second location of the sound source and the preset time interval, wherein the moving speed of the sound source is determined based on the preset time interval and a difference between a distance from the user to the first location and a distance from the user to the second location.

7. The method according to claim 1, wherein determining the quantity of speakers comprises:

obtaining a voice signal in the ambient sound, and segmenting the voice signal;

performing clustering processing on segmented voice signals, to determine the quantity of speakers.

8. A headset, comprising:

a collector, configured to:

collect environment information, and determine key sound detection sensitivity based on the environment information, the key sound detection sensitivity indicating sensitivity of detecting a predetermined sound, by:

determining that the key sound detection sensitivity is a first value when at least one of the following conditions is satisfied:

(1) a driving speed indicated by a speed limit parameter of a road corresponding to a current location of a user exceeds a first preset value;

(2) a driving speed indicated by a speed limit parameter of a road on which the user is currently located exceeds the first preset value;

(3) a horn sound in the environment information is a horn sound of a first preset vehicle;

(4) a distance between a sound source location determined based on an ambient sound and the user is less than a second preset value; or (5) a moving speed of a sound source determined based on a first ambient sound, a second ambient sound, and a preset time interval exceeds a third preset value; or determining that the key sound detection sensitivity is a second value when a quantity of speakers determined by performing clustering processing on segmented voice signals obtained from an ambient sound exceeds a fourth preset value;

a detector, configured to perform detection of the predetermined sound in the environment information based on the key sound detection sensitivity; and at least one processor, configured to: upon detecting the predetermined sound in the environment information, adjust the headset to a hear through mode in which the headset lets one or more ambient sounds in, or play the predetermined sound.

9. The headset according to claim 8, wherein the environment information comprises the current location of the user, and the collector is further configured to determine that the driving speed indicated by the speed limit parameter of the road corresponding to the current location of the user exceeds the first preset value by:

obtaining the current location of the user by using a positioning sensor;

obtaining by querying map information based on the current location of the user, the speed limit parameter of a road corresponding to the current location of the user; and determining, based on the speed limit parameter of the road, the driving speed indicated by the speed limit parameter.

10. The headset according to claim 8, wherein the environment information comprises the speed limit parameter of the road on which the user is currently located, and the collector is further configured to determine that the driving speed indicated by the speed limit parameter of the road on which the user is currently located exceeds the first preset value by:

collecting, by using an image sensor, an image of the road on which the user is currently located;

obtaining traffic sign information by processing the image;

obtaining the speed limit parameter of the road based on the traffic sign information, and determining, based on the speed limit parameter of the road, the driving speed indicated by the speed limit parameter.

11. The headset according to claim 8, wherein the environment information comprises the horn sound, and the collector is further configured to:

determine that the horn sound in the environment information is the horn sound of the first preset vehicle by:

inputting the horn sound into a pre-trained support vector machine model of neural network model; and identifying, by the pre-trained support vector machine model of neural network model, whether a vehicle corresponding to the horn sound is the first preset vehicle.

12. The headset according to claim 8, wherein the collector is further configured to:

determine the distance between the sound source location determined based on the ambient sound and the user by:

performing sound source positioning based on the ambient sound by using beamforming or a time difference of arrival method to determine the sound source location; and determining the distance between the sound source location and the user.

13. The headset according to claim 8, wherein the collector is further configured to:

determine the moving speed of the sound source based on the first ambient sound, the second ambient sound, and the preset time interval by:

determining a first location and a second location of the sound source separately based on the first ambient sound and the second ambient sound; and determining the moving speed of the sound source based on the first location and the second location of the sound source and the preset time interval, wherein the moving speed of the sound source is determined based on the preset time interval and a difference between a distance from the user to the first location and a distance from the user to the second location.

14. The headset according to claim 8, wherein the collector is further configured to determine the quantity of speakers by:

obtaining a voice signal in the ambient sound, and segment the voice signal;

performing clustering processing on segmented voice signals, to determine the quantity of speakers.

15. A headset, comprising:

a determinator, configured to determine that key sound detection sensitivity of a headset is a first value, wherein the key sound detection sensitivity comprises a key sound detection duration, the first value is determined based on a request sent by a user for improving the key sound detection sensitivity of the headset, and the key sound detection sensitivity indicates sensitivity of detecting a predetermined sound;

a detector, configured to collect environment information, and perform detection of the predetermined sound in the environment information based on the first value; and at least one processor, configured to: upon detecting the predetermined sound in the environment information, adjust the headset to a hear through mode in which the headset lets one or more ambient sounds in, or play the predetermined sound, wherein the determinator is configured to determine the first value, in response to the request sent by the user for improving the key sound detection sensitivity of the headset, by multiplying the key sound detection duration by a multiplication factor.

16. The headset according to claim 15, wherein the environment information comprises one or more ambient sounds, a current location of a user, a speed limit parameter of a road on which a user is currently located, or a horn sound.

17. The method according to claim 1, wherein the key sound detection duration comprises a period from a time when the predetermined sound is detected by the headset to a time when a mode of operation of the headset is switched.

* * * * *